(12) United States Patent
Gnech et al.

(10) Patent No.: US 8,782,148 B2
(45) Date of Patent: Jul. 15, 2014

(54) MANAGING REDUNDANCY IN ELECTRONIC MAIL MESSAGES

(75) Inventors: Thomas H. Gnech, Ammerbuch (DE); Joachim Rese, Hockenheim (DE)

(73) Assignee: International Business Machines Corporation, Armonk, NY (US)

( * ) Notice: Subject to any disclaimer, the term of this patent is extended or adjusted under 35 U.S.C. 154(b) by 502 days.

(21) Appl. No.: 12/909,941

(22) Filed: Oct. 22, 2010

(65) Prior Publication Data

US 2011/0145346 A1 Jun. 16, 2011

(30) Foreign Application Priority Data

Dec. 16, 2009 (EP) .................................. 09179364

(51) Int. Cl.
*G06F 15/16* (2006.01)
(52) U.S. Cl.
USPC .......................................... 709/206; 709/207
(58) Field of Classification Search
USPC .................................................. 709/206, 207
See application file for complete search history.

(56) References Cited

U.S. PATENT DOCUMENTS

| | | | |
|---|---|---|---|
| 6,549,957 B1 * | 4/2003 | Hanson et al. ..................... 710/5 |
| 7,310,660 B1 * | 12/2007 | White et al. ................... 709/206 |
| 8,131,806 B2 * | 3/2012 | Chen et al. ..................... 709/206 |
| 8,135,778 B1 * | 3/2012 | Chin et al. ..................... 709/206 |
| 2006/0020668 A1 | 1/2006 | Chen et al. |
| 2007/0038714 A1 * | 2/2007 | Sell ................................. 709/206 |
| 2007/0299915 A1 * | 12/2007 | Shraim et al. ................. 709/206 |
| 2008/0288603 A1 * | 11/2008 | Malcolm ....................... 709/206 |
| 2009/0125506 A1 * | 5/2009 | Kim ................................. 707/5 |

FOREIGN PATENT DOCUMENTS

EP 1739905 A1 1/2007

* cited by examiner

*Primary Examiner* — Barbara Burgess
(74) *Attorney, Agent, or Firm* — Katherine S. Brown; Jeffrey L. Streets

(57) ABSTRACT

A computer implemented method and system is provided for managing emails within an email system or email box. At the creation of a new email at the email system, an identification of its content (CID) is calculated, the result of that calculation being stored in a header of that email to be forwarded together with the new email. It is checked at the email system when receiving an email to determine whether the email includes a CID identifying the content of that email. If this is not the case, then a CID of the content of the received email is calculated, the resulting CID being stored in the header of that email together with the email. A comparison between the received email and the already stored emails at the email system is performed by comparing the corresponding CID of the received email with the CID of the stored emails. The email system is reorganized by superseding duplicate emails having the same CID.

17 Claims, 5 Drawing Sheets

| Inbox | |
|---|---|
| email #1 | Contains: <MsgA> <File1> <File2> |
| email #2 | Contains: <MsgB> <MsgA> <File1> <File2> |
| email #3 | Contains: <MsgC> <MsgA> |
| email #4 | Contains: <MsgD> <MsgC> <MsgA> <File1> <File2> |
| email #5 | Contains: <MsgE> <MsgA> <File3> |

Fig. 5 a

```
email #1 (file1, file2)
        email #2 (file1, file2)
        email #3
                email #4 (file1, file2)
        email #5 (file3)
```

Fig. 5 b

MANAGING REDUNDANCY IN
ELECTRONIC MAIL MESSAGES

CROSS-REFERENCE TO RELATED APPLICATIONS

This application claims priority under 35 U.S.C. §119 to European Patent Application No. 09179364.6 filed Dec. 16, 2009, the entire text of which is specifically incorporated by reference herein.

BACKGROUND

1. Field of the Invention

This invention relates generally to electronic mail messages, and more particularly to a computer implemented method, computer program product and a system for managing electronic mail messages within an email system.

2. Background of the Related Art

Currently, email clients such as MICROSOFT OUTLOOK and LOTUS NOTES enable a user to exchange electronic messages with other users through networked email servers. If a user wants to respond to a message, the user activates a "reply" command. In general, an email client responds to a "reply" command by creating a new message with the same subject line usually prefixed by some forwarding indication like "Fw:", "Aw:", "Re:" etc. Frequently, the reply email contains the original message in addition to the reply text. Often, the original message is not deleted and many email clients copy the content of the original message into the reply message.

Copying the content of the original message into the reply message causes multiple copies of the original message to be stored on the email server and on the client's computer. The parties may engage in an exchange based on the original email. Each new reply may contain the cumulative text of all the previous emails. As the prior emails may not be deleted, this results in wasted disk space on the client, the server, or both. Another result is performance degradation for mail replication, delivery and increased analysis effort due to complexity. Often, email servers block mails exceeding certain size limits The maintenance of redundant emails is time consuming for the receiver, because he needs to view and analyze each email in order to detect redundancies.

BRIEF SUMMARY

One embodiment of the present invention provides a computer implemented method for managing emails within an email system or email box, the method comprising the following steps. At the creation or building of a new email at the email system, an identification of content (i.e., content identifier code, CID) is calculated, the result of that calculation being stored in a header of the new email to be sent together with the new email. When the email system receives an email, the received email is checked to determine if the email comprises an identification of content for the received email. If the received email does not comprise an identification of content, then an identification of content for the received email is calculated, and the resulting identification of content is stored in a header of the received email together with the received email. A comparison between the received email and the already stored emails at the email system is performed by comparing the corresponding identification of content of the received email with the identification of content of the stored emails. The email system is reorganized by superseding duplicate emails having the same identification of content.

Another embodiment of the invention provides a computer program product comprising a computer usable medium including computer usable program code for managing emails within an email system. The computer usable program code comprises:

Computer usable program code for calculating an identification of content for a new email created at an email system and storing the identification of content in a header of the new email to be sent together with the new email;

Computer usable program code for determining, at the email system when receiving an email, whether an identification of content for the received email is within a header of the received email;

Computer usable program code for calculating an identification of content of the received email when the received email does not contain an identification of content and storing the identification of content in a header of the received email together with the received email;

Computer usable program code for comparing the received email with already stored emails of the email system by comparing the identification of content for the received email with the identification of content for the already stored emails;

Computer usable program code for reorganizing the email system by superseding duplicate emails having the same identification of content.

Yet another embodiment of the invention provides a system for managing emails within some computing environment, the system comprising a processor and a storage device, wherein the storage device stores computer usable program code. The processor executes the computer usable program code to manage emails within the email box following all or part of the above described steps.

BRIEF DESCRIPTION OF THE SEVERAL VIEW OF THE DRAWINGS

FIGS. 5a and 5b represent an implementation according to the invention.

DETAILED DESCRIPTION

Figure 1:
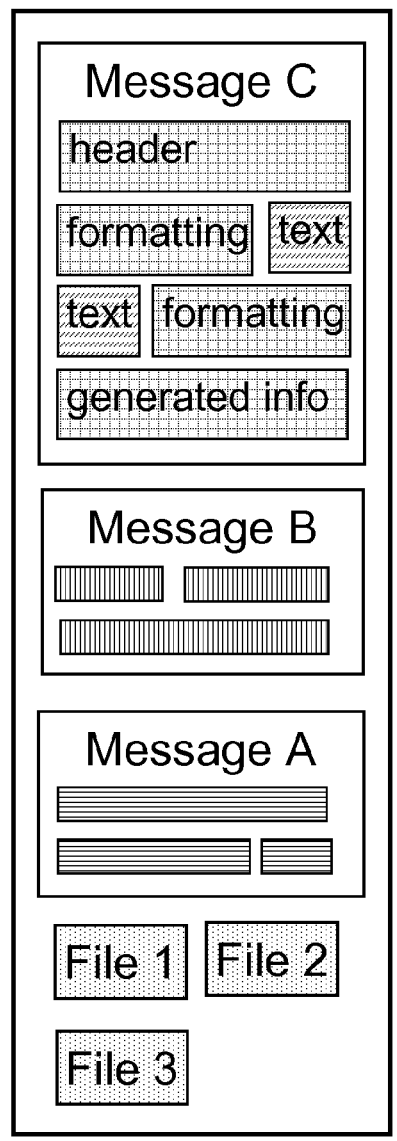
FIG. 1 is a schematic view of an email structure according to prior art.

One embodiment of the present invention provides a computer implemented method for managing emails within an email system or email box, the method comprising the following steps. At the creation or building of a new email at the email system, an identification of content (i.e., content identifier, CID) is calculated, the result of that calculation being stored in a header of the new email to be sent together with the new email. When the email system receives an email, the received email is checked to determine if the email comprises an identification of content for the received email. If the received email does not comprise an identification of content, then an identification of content for the received email is calculated, and the resulting identification of content is stored in a header of the received email together with the received email. A comparison between the received email and the already stored emails at the email system is performed by comparing the corresponding identification of content of the received email with the identification of content of the stored emails. The email system is reorganized by superseding duplicate emails having the same identification of content.

In an alternative embodiment of the invention, the CID of the content of the email comprises a CID for the body of the email and a CID for each possible attachment to that email. The method advantageously comprises further steps to analyze the body of the email using some pattern matching procedure to find out each separable part of the body of the email. In the case of more than one separable parts, a CID for each part is generated. All CIDs are stored into the header of the processed email.

The calculated CID is obtained by building a checksum from the content of the email. Alternately, the CID can be calculated using some common algorithm ensuring to obtain a unique ID of the email content allowing to fix email content authenticity.

The step of reorganizing the email system using the respective CIDs of the stored emails can be performed following different implementations. An advantageous one includes marking a CID corresponding to the content of an email already stored at the email system as redundant or superseded. The so marked emails can possibly be hidden, deleted or simply moved to some specific folder.

In a further alternative embodiment of the invention, a receiver option is stored in the header of the email to be forwarded. Such receiver option when correctly detected at the recipient email system allows indicating to revoke delivery of that email at recipient side in case analysis performed by recipient email system on the CID from the email to be delivered results in classifying that email as superseded.

In another alternative embodiment of the present invention, a new CID of the content of an email is calculated each time the content of that email is modified. The newly calculated CID is stored at the header of the email possibly overwriting previous CID.

Yet another embodiment of the invention provides a computer program product comprising a computer usable medium including computer usable program code for managing emails within an email system. The computer usable program code comprises:

Computer usable program code for calculating an identification of content for a new email created at a first email system and storing the identification of content in a header of the new email to be sent together with the new email;

Computer usable program code for determining, at the email system when receiving an email, whether an identification of content for the received email is within a header of the received email;

Computer usable program code for calculating an identification of content of the received email when the received email does not contain an identification of content and storing the identification of content in a header of the received email together with the received email;

Computer usable program code for comparing the received email with already stored emails of the email system by comparing the identification of content for the received email with the identification for content for the already stored emails;

Computer usable program code for reorganizing the email system by superseding duplicate emails having the same identification of content.

In a further embodiment, the computer usable program code further comprises computer usable program code for calculating a CID for the body of the email and a CID for each possible attachment to that email, the different CIDs being combined when stored in the header of the email. Furthermore, the computer usable program code possibly comprises code for analyzing the body of the email using some pattern matching procedure to find out each separable part of the body of the email. Also code for calculating a corresponding CID to the found separable part of the body is used such that the different calculated CIDs being stored into the header of the email. The computer usable program code comprises further some code for reorganizing the email box using the different CIDs of an email such that CIDs corresponding to contents of emails already stored at the email box are marked.

In an embodiment according to the invention, the computer usable program code comprises code for calculating a new CID of the content of an email when the content of that email being modified while overwriting the previous CID with the newly one in the header of that email. The computer usable program code comprises also some code for defining a receiver option indicating to the recipient email system to revoke delivery of an email comprising such option stored in its header together with its CID if an analysis by the recipient email system of the CID from the email to be delivered results in classifying that email as superseded.

The invention also relates to a system for managing emails within some computing environment, the system comprising a storage device wherein the storage device stores computer usable program code and at least a processor. The processor executes the computer usable program code to manage emails within the email box following all or part of the above described steps.

FIG. 1 is a schematic diagram of one example of an email structure made out of several messages, which is a common situation. The email is a concatenated thread comprising a sequence of three messages (Message A-C) followed by three files (Files 1-3) attached to the email. Each message A-C corresponds to a specific email. In the present example, Message A could be considered to be the first email written by A and forwarded by the recipient B together with a new Message B to a third addressee C who answered to it with Message C. Files 1, 2 and 3 are files attached by one or several of the authors of the Messages A, B or C. And as shown on FIG. 1, each message itself can be divided in several parts starting with a header that may be structured into fields, such as a summary, sender, receiver and other information about the email. The header is followed by formatting information, like html tags, and by the part of the email containing the pure information (usually, but not necessarily, including text).

Existing email systems modify the original messages. For example, some headers may be inserted into the email. Often, the text is converted to html. Sometimes informative messages are appended to the email, in particular to show the result of a virus scan ("no virus detected"). But the essential portion of the email does not include any of these modifications. Thus, a checksum of a message calculated only on the essential portion of the email does not change if an email system processes the email. The essential portion of the email can be seen as a normalization of the message. Email systems might convert the original email into an email of the Multipurpose Internet Mail Extensions (MIME) standard, type multipart (RFC2046) that contains the same information multiple times, for example in text format and also in html format. The essential portion of the email must contain only one of these parts. Since by definition the email is invariant up to formatting etc., it is irrelevant which part the essential portion of the email actual contains. In particular, the checksum of all parts is the same.

According to the present invention, it is proposed that to each email managed by an email system or email box, an identification of the email's content (CID) is appended to the email, such content identification (CID) being preferably stored in the header of the respective email. A new email header is then defined which is called (in the following example) "contains-header". The contains-header comprises a calculated CID for each message being part of the email and for each file attached to the email. The CID is derived from the normalized content of a message. The normalized content is the pure text of a message (essential) or an attached file and shall not contain any element from the email that might be added or modified by an email system. The CIDs themselves are stored in the contains-header and will also not be modified by any email system. Such an implementation can be performed in agreement with the standard RFC 5322 (Request for Comments: Internet Message Format from IETF, so to say standard for email communication) by using a prefix "X" for the newly introduced contains-header.

In an embodiment according to the present invention, the CID is obtained by generating a corresponding checksum for the each of the messages and each of the attached files. Other hash procedures or functions could be applied as long as it allows defining a unique identification to the content of the email. The contains-header of the email shown on FIG. 1 could look like:

Contains: <CID Message C> <CID Message B> <CID Message A> <CID File 1> <CID File 2> <CID File 3>

It is recommended to make the CID of a message and the CID of a file distinguishable, for example by adding a prefix to the latter one. For example, the contains header in the preceding paragraph might look like:

Contains: 3487583 684392 12748583 A_746372 A_2398 A_86285645

Alternatively, CIDs of messages and CIDs of files can be specified in separate headers.

Preferably, the CID of a message is invariant, for example up to the formatting, so that it will not change when an email is processed by an email system.

Figure 2:
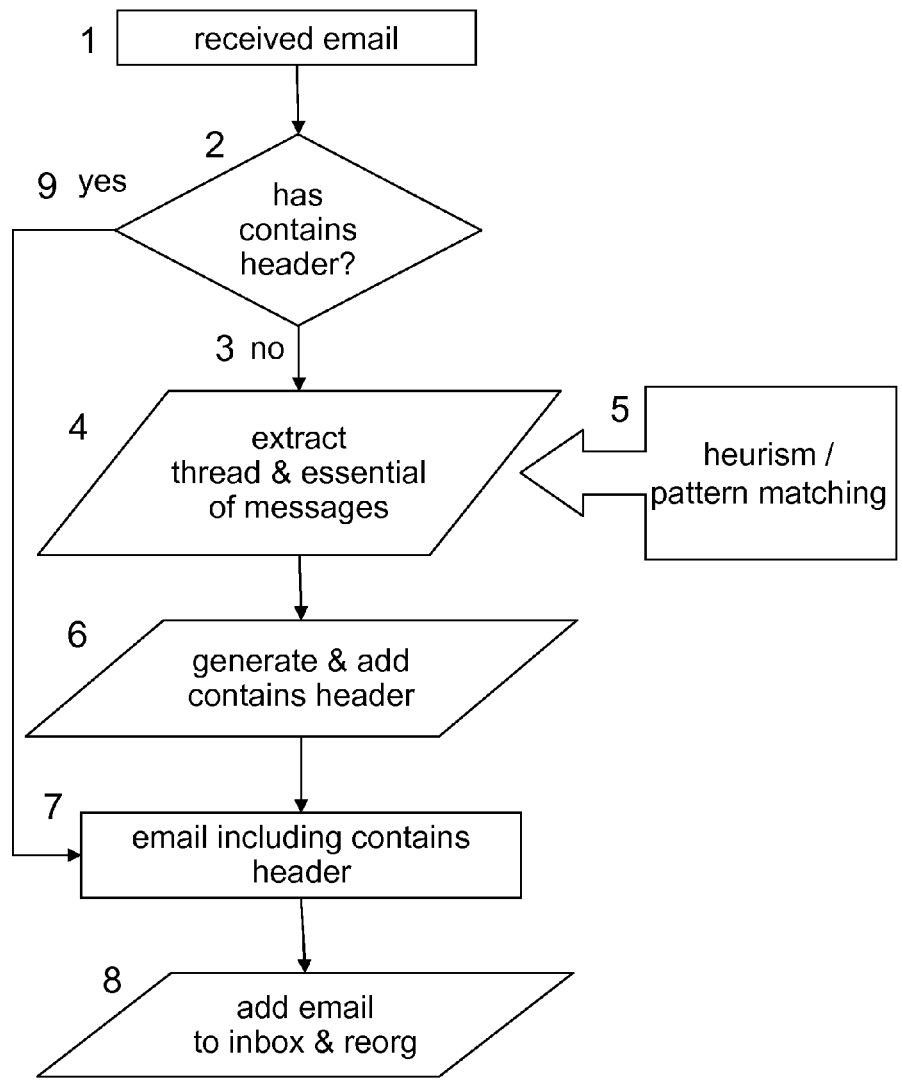
FIG. 2 is a flow diagram of an implementation according to the invention.

FIG. 2 is a flow diagram according to one embodiment of the present invention corresponding to the reception of an email by an email system or email box. The procedure starts when an email is received in step 1. In step 2, a checking procedure is performed to find out if the received email includes a contains-header according to this invention. In the case that none of such contains-headers are found in the email, then a new contains-header must be generated. This is achieved by extracting the corresponding thread to find the essential portion of that email in step 4, possibly by applying some heuristic or pattern matching means per block/step 5. Accordingly, step 6 builds a contains-header using the CIDs calculated using some common algorithms to ensure document authenticity or by applying a simple checksum on the extracted essential portions and, possibly, on the extracted attached files. Such newly built contains-header is added to the email in step 7 and is moved to the recipient's email box in step 8. Then, the email box may be reorganized to avoid any replication or redundant information. In the alternative case that the email already comprises a contains-header according to the invention (as determined in step 2), then the procedure advances per step 9 to step 7, such that the email is ready to be directly moved to the recipient's email box (per step 8) to be processed for the reorganization of the email box.

In a homogenous environment i.e. when communication take place within the same email system product, the contains-header is already part of the email and does not need to be calculated. If the incoming email has a contains-header, but it cannot be interpreted by the email system (e.g. because it has been calculated by a different email system product), it must be deleted to be updated by a new calculated one. Since the thread comes as one entity within the email body, extracting the thread is not trivial. Pattern matching methods need to be applied to split the email body into multiple messages. The above described process can be performed on the client or server. If different email systems use individual algorithms for CID calculation, but generate contains-headers of the same format, these headers are compatible and do not need to be newly calculated.

Figure 3:
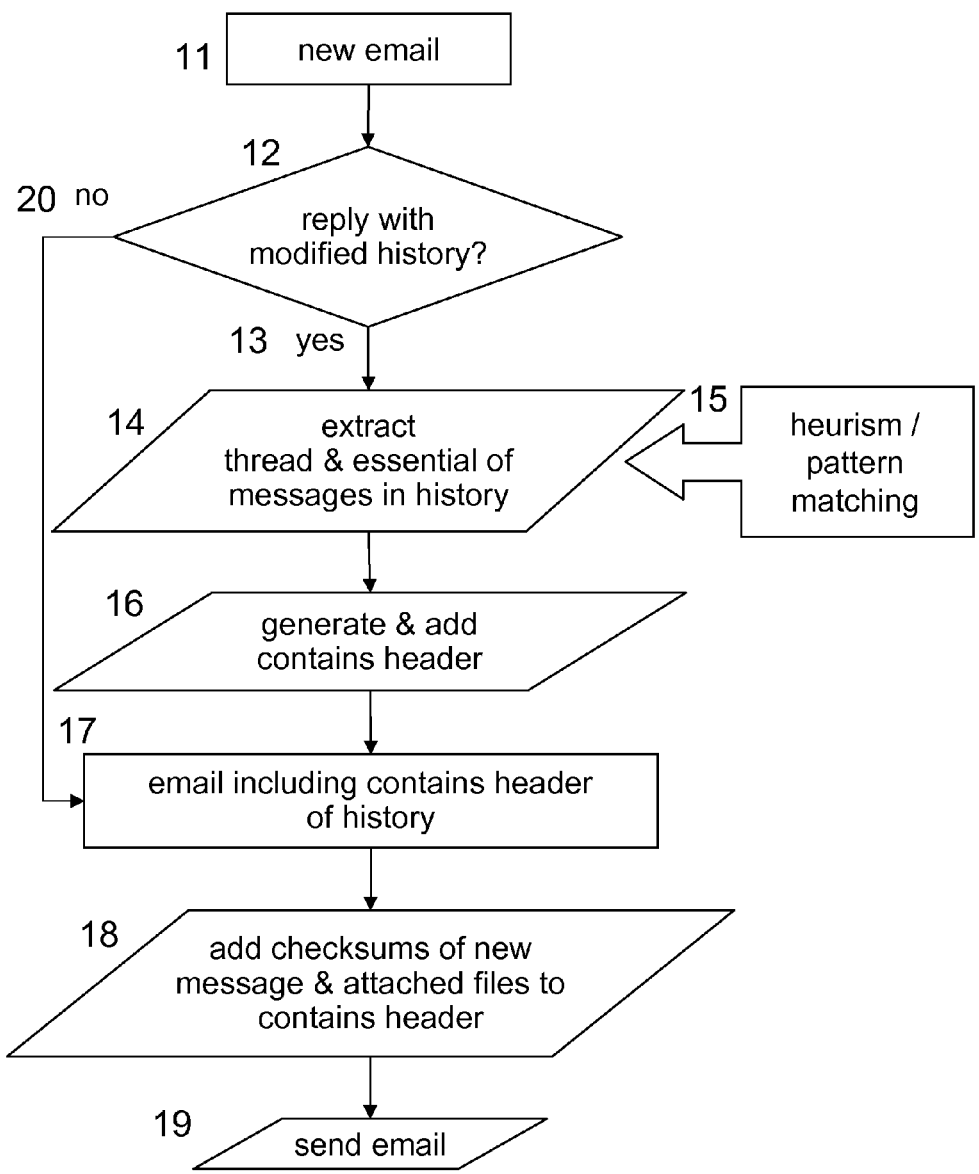
FIG. 3 is a flow diagram of an implementation according to the invention.

FIG. 3 is a flow diagram according to another embodiment of the present invention corresponding to the sending of an email. At first, a new email is generated in step 11. In step 12, it is checked if the new email is a forwarding response to some previous email or if a message thread with the body of some other message or message thread being forwarded was changed. If the message thread was changed, then in step 13, the thread and essential portion of the new email are extracted from the history information in step 14, for example by applying some heuristic or pattern matching procedure as indicated in step/block 15. In step 16, new CIDs, for example using checksums, are generated for the changed parts of the emails to be added to the new email. In such a way, step 17 updates the new email with a header required according to this invention comprising all the CIDs. The contains-header is extended by adding the checksums of the new email and the checksums of the new attachments to the contains-header in step 18. The newly obtained email is ready to be sent in step 19. In the alternative case that step 12 determines that no history was modified, e.g. because a first email was written from scratch or as answer of a previous one without performing any modification on the previous one, then the procedure continues along branch 20 directly to step 17 so that a checksum is generated defining a CID for the new part. In this alternative case, the contains-header is for the first time built or extended if already present in step 18 by appending the CID of the new email (message) and/or the new attachments into its header to be ready to be sent in step 19.

Since a contains-header is appended or updated to each received or generated email, all emails on the client or server will have a contains-header. Ideally the sender replies to an email by just adding a new message without touching the history. This is the most common case. Then only the checksum of the new message needs to be calculated. This is a trivial operation, because the new message still has raw format, i.e. it has not been processed by any email system. In this case no heroism or pattern matching algorithms need to be performed. However, if the sender modifies the history, the corresponding CIDs become invalid and need to be re-calculated.

If the receiver (user receiving the email) does not change the text of the history, but only its format, for example by highlighting some passages, the re-calculated checksum could be the same as before. The original email (without highlighted passages) could nevertheless be detected by the email system as superseded to be replaced by the new email (with highlighted passages) although the latter one does not contain an exact copy of the original email. Usually this is not a problem, since the newer email (with highlighted passages), that is kept will contain more information and therefore in fact supersedes the original email from a semantic point of view.

Before an email is sent, the email system determines whether the appended email thread (i.e. the history) has been modified. If not, which is the most common case, the existing contains-header is valid. Otherwise a new valid contains-header needs to be calculated like described before. The CIDs derived from the normalized content of the new message, i.e. the essential portion, is added to the contains-header of the history. This is a trivial operation since the new message has just been typed by the sender and not yet formatted by any email system. Therefore the normalized content, i.e. the essential, can easily be identified. Also, CIDs referring to deleted attachments are removed and CIDs for new attachments are added.

Reorganization of the mailbox is done according to the information comprised in the contains-header. All emails in the mailbox have a contains-header. Emails with a contains-header comprising CIDs that are also part of the contains-header of the new email become redundant because all information is already included in the new email. The emails are then processed in some specific way. For example, such redundant emails are marked as redundant, superseded, or hidden, or moved to some folder or deleted.

Figure 4:
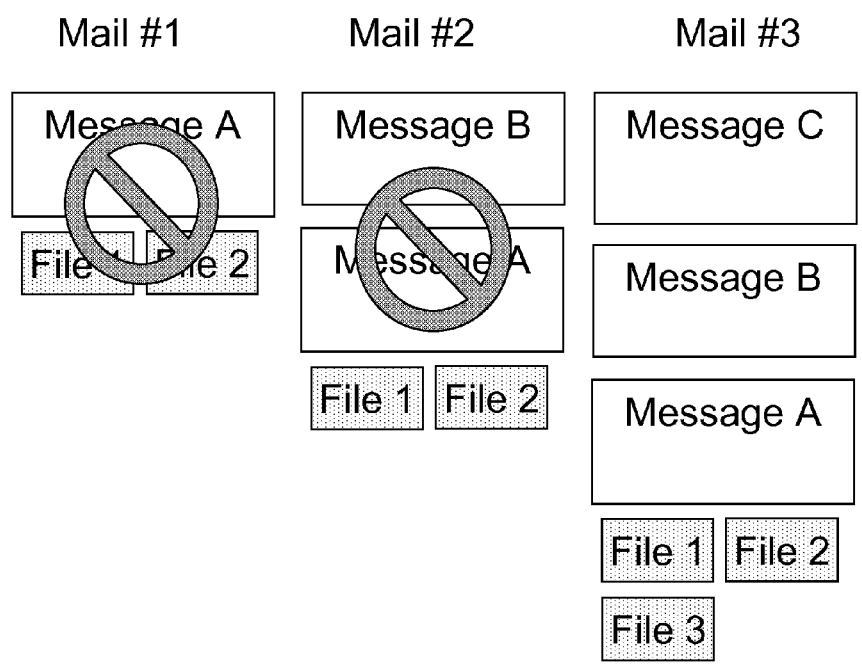
FIG. 4 is a schematic diagram of an implementation according to the invention.

In FIG. 4 is shown such a situation where the email box comprises at least three emails, namely:

Mail#1 with a Message A and two attached File 1 and 2;

Mail#2 with Message A (identical to the one in Mail#1), Message B and two attached Files 1 and 2 (identical to the files in Mail#1); and Mail#3 with Messages A, B and C and three attached Files 1, 2 and 3. Accordingly, and since Mail#3 already contains all messages and attachments from Mail#1 and Mail#2, Mail#1 and Mail#2 can be considered as superseded emails to be marked appropriately, hidden or moved to a specific holder possibly to be deleted by the email system.

Probably, an appropriate option to handle a superseded email would be to hide it if storage is not an issue. In such a way, the receiver will not be disturbed by such email which does not contain any further information. And a hidden email can be shown back if the marking as superseded is removed from that email. Each time an email has been deleted from the mailbox, some emails that are superseded by the deleted email might not be redundant anymore. Those emails must then be processed accordingly in an appropriate way like being marked as not redundant/superseded or unhidden or returned to the inbox folder.

FIG. 5a is a diagram of possible content of an email system or email box (Inbox). Five emails are stored there (email #1 to email #5) with different threads. The respective contains-header is also shown and allows the email system to recognize easily which email may be redundant taking into account that <MsgA/B/C/D/E> correspond to different messages and <File1/2/3> to different attached files. A comparison of all the fives emails using the contains-header, i.e. the respective CIDs, gives as a result that email #1 and email #3 as well as attachments File 1 and 2 of Email #2 are redundant. FIG. 5b is a diagram showing a possible way to display the result of such a comparison by, for example, using different colours between redundant and not redundant emails (here normal and bold fonts).

Another email header, possibly called "receiver-options-header" can be defined according to the present invention. Such header could be used when email systems support the contains-header and then add the effect of additional redundancy reduction. With the receiver-options-header the sender of an email can specify that delivery of that email is rejected if it turned out to be redundant on the receiver side. The receiver-options-header also defines an email as to be considered redundant. For example, an email can be redundant if the original, first message or the entire thread (excluding the new message) in that email is already part of some email in the recipient's mailbox. Alternately, an email is already considered redundant if all its attachments are already part of some emails in the recipient's mailbox. All these redundancy checks are done by comparing the contains-header, i.e. the respective CID, of the sent email with the contains-headers of the emails in the recipient's mailbox. The emails as such do not need to be analysed, i.e. do not need to be opened by the email system. Only their respective headers will be used for such checking.

Different possible receiver-options could be defined allowing revoking delivery of an email, if the receiver already has the email according to defined criteria. For example three different receiver-options could be set like no_duplicate.all, no_duplicate.root and no_duplicate.file. In the first case, email is not delivered if the receiver already has an email that contains the entire thread (except the last new message added by the sender). In the second case, email is not delivered if the receiver already has an email that contains the root, i.e. the first message. And in the third case, the email is not delivered if the receiver already has an email that contains the attachments.

As one example, the following emails are already in the inbox, i.e. in the email system, of the recipient: Contains: <MsgB> <MsgA>. In that case, the following email would not be delivered Contains: <MsgE> <MsgB> <MsgA>; Receiver-Options: no_duplicate.all or Contains: <MsgE> <MsgD> <MsgA>; Receiver-Options: no_duplicate.root while <MsgE> is the last new message added by the sender. In contrast, an email having a header with Contains: <MsgE> <MsgC> <MsgB> <MsgA>; Receiver-Options: no_duplicate.all would be delivered since the mailbox does not contain <MsgC>.

The receiver-options header provides a particular advantage if an email is sent to a distribution list. By using the appropriate receiver-options, a sender can sent out an email to a large community while only those receivers get the email that do not already have it and this without comparing the whole email to be delivered with all the already stored email but only using the respective CIDs.

It is important to keep in mind that a reference-header and the contains-header have a different intention. Email threads are tracked by Message-ID and Reference headers. The Message-ID is a unique ID generated by the writer of an email. The Reference header is a sequence of Message-IDs of all emails of the email thread, like:

Message-ID: 036AC@global.corp

References: <E1-6E-22-4B @de.ibm.com> <2008-DE@mydomain.corp>

In Message-ID/References are stored information only related to references but not to some content of an individual email like text or attachments. The use of email threading techniques according to prior art allow only to rearrange all the emails according to the Message-ID/References. It does not support finding redundancies in content of emails.

The reference header is much more appropriate for tracking email threads, because it gives the complete communication hierarchy, regardless whether an email contains the history or not. However, to get a correct reference header, different email systems need to cooperate, which is actually not the case. For example, Microsoft's Exchange does not generate reference headers. If a reference header is not available, showing an email thread based on the contains-header is an alternative.

It is also possible to exploit both, contains and reference header. The latter one is used to show the thread while the contains-header can be used to mark redundancies in the email communication, for example by using different colors.

The use of the present invention does not imply a change of the content of the emails processed accordingly. This has some fundamental advantages like high end user acceptance since the email communication is not influenced. Also, it is compatible with algorithms used for document authenticity. An implementation of the present invention can be achieved in a simple and fast way while being compatible with existing email systems.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally,"

"may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer implemented method for managing emails within an email system, the method comprising:
    calculating an identification of content for a body of a new email created at the email system and an identification of content for each attachment to the new email and storing each identification of content in a header of the new email to be sent together with the new email;
    determining, when receiving an email at the email system, whether the received email includes an identification of content for a body of the received email or an identification of content for an attachment to the received email within the header of the received email;
    when the received email does not contain any identification of content, calculating an identification of content for the body of the received email and an identification of content for each attachment to the received email and storing each identification of content in the header of the received email together with the received email;
    comparing the received email with already stored emails at the email system by comparing the identification of content for the body of the received email with one or more identification of content of the stored emails; and
    a computer reorganizing the email system by superseding a redundant email, wherein each identification of content in the redundant email is also contained in another of the received or sent emails.

2. The method of claim 1, further comprising:
    analyzing the body of the email using a pattern matching procedure to find out each separable part of the body of the email; and
    calculating an identification of content for each of the separable parts of the body and storing identification of content for each of the separable parts in the header of the email.

3. The method of claim 2, wherein reorganizing the email system includes using the identification of content for the stored emails to detect redundant emails to be marked accordingly.

4. The method of claim 1, wherein reorganizing the email system includes using the identification of content for the stored emails to detect redundant emails to be marked accordingly.

5. The method of claim 1, wherein each identification of content for a body of the email is calculated by building a checksum from the content of the body of the email.

6. The method of claim 1, further comprising:
    calculating a new identification of content for an email in response to the content of that email being modified; and
    overwriting the previous identification of content with the new identification of content in the header of the email.

7. The method of claim 1, further comprising:
    storing a receiver option in the header of an email to be sent, wherein the receiver option instructs the recipient email system to revoke delivery of the email if the recipient email system determines, through analysis of the identification of content of the email to be delivered, that the email is classified as superseded.

8. The method of claim 1, wherein each identification of content for a body of the email is calculated by applying a hash function to the content of the body of the email.

9. A computer program product comprising a non-transitory computer usable storage medium including computer usable program code for managing emails within an email system, wherein the medium is not a signal, the computer usable program code comprising:
    computer usable program code for calculating an identification of content for a body of a new email created at the email system and an identification of content for each attachment to the new email and storing each identification of content in a header of the new email to be sent together with the new email;
    computer usable program code for determining, when receiving an email at the email system, whether the received email includes an identification of content for a body of the received email or an identification of content for an attachment to the received email within the header of the received email;
    computer usable program code for calculating, when the received email does not contain any identification of content, an identification of content for the body of the received email and an identification of content for each attachment to the received email and storing each identification of content in the header of the received email together with the received email;
    computer usable program code for comparing the received email with already stored emails at the email system by comparing the identification of content for the body of the received email with one or more identification of content of the stored emails; and
    computer usable program code for reorganizing the email system by superseding a redundant email, wherein each identification of content in the redundant email is also contained in another of the received or sent emails.

10. The computer program product of claim 9 wherein the computer usable program code further comprises:
    computer usable program code for analyzing the body of the email using a pattern matching procedure to find out each separable part of the body of the email; and
    computer usable program code for calculating an identification of content for each of the separable parts of the body and storing identification of content for each of the separable parts in the header of the email.

11. The computer program product of claim 10 further comprising:
    computer usable program code for reorganizing the email system using the respective different CIDs of the stored email to detect redundant ones to be marked accordingly.

12. The computer program product of claim 9 further comprising:

computer usable program code for reorganizing the email system using the identification of content for each of the stored emails to detect redundant emails to be marked accordingly.

13. The computer program product of claim 9, further comprising:
   computer usable program code for calculating an identification of content by building a checksum from the content of the email.

14. The computer program product of claim 9, further comprising:
   computer usable program code for calculating a new identification of content for an email in response to the content of that email being modified; and
   overwriting the previous identification of content with the newly identification of content in the header of that email.

15. The computer program product of claim 9, further comprising:
   computer usable program code for storing a receiver option in the header of an email to be sent, wherein the receive option instructs the recipient email system to revoke delivery of the email if the recipient email system determines, through analysis of the identification of content of the email to be delivered, that email is classified as superseded.

16. The computer program product of claim 9, wherein each identification of content for a body of the email is calculated by applying a hash function to the content of the body of the email.

17. A system for managing emails within some computing environment, the system comprising:
   a storage device, wherein the storage device stores computer usable program code; and
   a processor, wherein the processor executes the computer usable program code to manage emails within the email box following steps according to claim 1.

* * * * *